United States Patent
Nishikawa et al.

(10) Patent No.: US 9,427,817 B2
(45) Date of Patent: Aug. 30, 2016

(54) BRAZING METHOD

(71) Applicant: MITSUBISHI HEAVY INDUSTRIES, LTD., Tokyo (JP)

(72) Inventors: Kosuke Nishikawa, Tokyo (JP); Tetsuya Morifuji, Tokyo (JP); Kyozo Mizuno, Tokyo (JP); Nobuki Negoro, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/381,287

(22) PCT Filed: Feb. 19, 2013

(86) PCT No.: PCT/JP2013/054048
§ 371 (c)(1),
(2) Date: Aug. 27, 2014

(87) PCT Pub. No.: WO2013/129192
PCT Pub. Date: Sep. 6, 2013

(65) Prior Publication Data
US 2015/0090774 A1    Apr. 2, 2015

(30) Foreign Application Priority Data
Feb. 28, 2012  (JP) ................. 2012-041047

(51) Int. Cl.
*B23K 1/00* (2006.01)
*B23K 1/19* (2006.01)
(Continued)

(52) U.S. Cl.
CPC .............. *B23K 1/0008* (2013.01); *B23K 1/19* (2013.01); *B23K 1/20* (2013.01); *F02K 9/34* (2013.01); *F02K 9/64* (2013.01); *F05D 2230/237* (2013.01)

(58) Field of Classification Search
CPC .. B23K 2203/10; B23K 1/0012; B23K 1/18; B23K 1/19; B23K 20/023; B23K 20/08; B23K 20/16; B23K 2201/14; B23K 35/002; B23K 35/0227; B23K 35/0238; B23K 35/0261; B23K 35/286; B23K 35/288; C23C 28/021; C23C 24/087; C23C 24/106; C23C 28/023; C23C 28/321
See application file for complete search history.

(56) References Cited

U.S. PATENT DOCUMENTS 5,701,670 A    12/1997  Fisher et al.
2002/0088717 A1  7/2002  Wittebrood et al.
(Continued)

FOREIGN PATENT DOCUMENTS

JP    62-13258    1/1987
JP    2001-1133   1/2001
(Continued)

OTHER PUBLICATIONS

JP 2001001133 A computer english translation.*
(Continued)

*Primary Examiner* — Erin Saad
(74) *Attorney, Agent, or Firm* — Wenderoth, Lind & Ponack, L.L.P.

(57) ABSTRACT

According to this brazing method, a first base member having a non-plated surface, a metal layer for functioning as a diffusion barrier layer, a brazing foil, and a second base member having a surface are arranged in this order so that the non-plated surface of the first base member and the surface of the second base member are faced with each other. The first base member and the second base member are brazed by using the brazing foil. The cost of providing a diffusion barrier layer between the first base member and the brazing foil is thereby reduced.

10 Claims, 11 Drawing Sheets

(51) Int. Cl.
*F02K 9/34* (2006.01)
*B23K 1/20* (2006.01)
*F02K 9/64* (2006.01)

(56) References Cited

U.S. PATENT DOCUMENTS

| | | |
|---|---|---|
| 2002/0127135 A1 | 9/2002 | Ohara et al. |
| 2006/0121304 A1* | 6/2006 | Gorman et al. ............. 428/621 |
| 2007/0029369 A1* | 2/2007 | Watkins et al. ............. 228/183 |
| 2007/0029396 A1 | 2/2007 | Braun et al. |

FOREIGN PATENT DOCUMENTS

| | | |
|---|---|---|
| JP | 2001001133 A * | 1/2001 |
| JP | 2001-252760 | 9/2001 |
| JP | 2001-300721 | 10/2001 |
| JP | 2004-169702 | 6/2004 |
| JP | 2004-535931 | 12/2004 |
| JP | 2007-38298 | 2/2007 |

OTHER PUBLICATIONS

International Preliminary Report on Patentability and Written Opinion of the International Searching Authority issued Sep. 2, 2014 in International (PCT) Application No. PCT/JP2013/054048.

International Search Report issued May 21, 2013 in International (PCT) Application No. PCT/JP2013/054048.

* cited by examiner

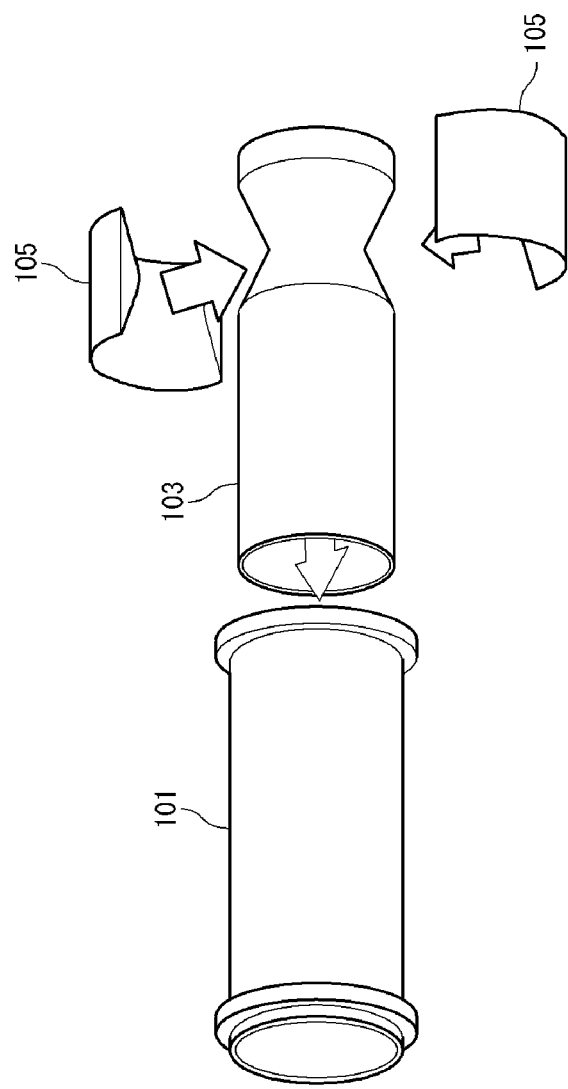

BRAZING METHOD

TECHNICAL FIELD

The present invention relates to a brazing method and a method of making a combustion chamber of a rocket engine.

BACKGROUND ART

A method of making a combustion chamber of a rocket engine disclosed in Patent Literature 1 will be explained. In this method of making the combustion chamber of the rocket engine, brazing is used. The method of making the combustion chamber of the rocket engine includes following steps. A coolant liner is produced. The coolant liner is made of copper alloy. A plurality of coolant fluid channels are formed in an outer surface of the coolant liner. At least two throat supports are produced. A structural jacket having a manifold is produced. The throat supports and the structural jacket are made of stainless steel. The coolant liner is plated with gold. The throat supports and the structural jacket are plated with nickel. The throat supports are assembled around the outer surface of the coolant liner, and a combustion chamber assembly is produced by inserting the throat supports and the coolant liner into the structural jacket. Here, a brazing alloy foil is inserted among the coolant liner, the throat supports, and the structural jacket. The coolant fluid channels are closed out by forming a sealing joint (not shown) between the coolant liner and the structural jacket. The combustion chamber assembly is placed into a pressurized furnace (not shown). By pressurizing in the furnace, the coolant liner, the throat supports and the structural jacket are brought into contact with each other. By heating the combustion chamber assembly, the coolant liner, the throat supports and the structural jacket are bonded while pressurizing in the furnace. The manifold of the structural jacket and the coolant fluid channels are connected.

Patent Literature 2 discloses a method of making a combustion chamber of a rocket engine. In this method, brazing by hot iso-static pressing process (HIP brazing) is performed.

CITATION LIST

Patent Literature

Patent Literature 1: U.S. Pat. No. 5,701,670A
Patent Literature 2: Japanese Patent Application Publication JP2004-169702A

SUMMARY OF THE INVENTION

The present invention may provide a brazing method and a method of making a combustion chamber of a rocket engine, which can reduce costs for providing a diffusion barrier layer between a base member and a brazing foil.

According to the first aspect of the method, the method includes a step of arranging a first base member having a non-plated first surface, a metal layer serving as a diffusion barrier layer, a brazing foil, and a second base member having a second surface in order of the first base member, the metal layer, the brazing foil, and the second base member so that the non-plated first surface of the first base member and the second surface of the second base member are faced with each other, and a step of brazing the first base member and the second base member using the brazing foil.

Since it is not necessary to form the metal layer, which serves as the diffusion barrier layer, on the first base member by plating, a large-size plating bath for plating the first base member is not required. Therefore, the costs for providing the diffusion barrier layer are reduced.

In the step of arranging the first base member, the metal layer, the brazing foil, and the second base member, a laminated body may be disposed between the first base member and the second base member. The laminated body includes the brazing foil and the metal layer coupled to the brazing foil.

There may be a plurality of the laminated bodies. In the step of disposing the first base member, the metal layer, the brazing foil, and the second base member, the plurality of laminated bodies are arranged along the non-plated first surface and the second surface.

By using the plurality of laminated bodies, a size of each laminated body can be reduced. Therefore, making of the laminate body is easy.

The brazing method may further include a step of making the laminated body by forming the metal layer on a surface of the brazing foil by electroplating.

The brazing method may further include a step of making the laminated body by forming the metal layer on a surface of the brazing foil by sputtering.

The brazing method may further include a step of making the laminated body by press-bonding a metal foil for forming the metal layer to the brazing foil.

In the step of arranging the first base member, the metal layer, the brazing foil, and the second base member, the metal layer may be a first metal foil.

Since the metal layer is the metal foil, plating process, sputtering process, and the press-bonding process for the brazing foil are not necessary.

The second surface may be a non-plated surface. In the step of arranging the first base member, the metal layer, the brazing foil, and the second base member, a second metal foil serving as another diffusion barrier layer may be disposed between the brazing foil and the second base member. A material of the second metal foil may be different from a material of the first metal foil.

Placing the metal foils of different materials from each other on both sides of the brazing foil is easier than forming the metal layers of different materials from each other on both sides of the brazing foil by plating, etc.

According to the second aspect of the method, the method of making the combustion chamber of the rocket engine includes a step of arranging a first base member having a non-plated first surface, a metal layer serving as a diffusion barrier layer, a brazing foil, and a second base member having a second surface in order of the first base member, the metal layer, the brazing foil, and the second base member so that the non-plated first surface of the first base member and the second surface of the second base member are faced with each other, and a step of brazing the first base member and the second base member using the brazing foil.

Since it is not necessary to form the metal layer, which serves as a diffusion barrier layer, on the first base member by plating, a large-size plating bath for plating the first base member is not required. Therefore, the costs for providing the diffusion barrier layer are reduced.

A coolant channel serving as a flow passage of coolant fluid may be formed in the non-plated first surface.

Since it is not necessary to form the metal layer, which serves as the diffusion barrier layer, on the first base member by plating, masking the coolant channel for preventing the flow passage from being blocked by the mass of the plating material is not required.

According to the present invention, the brazing method and the method of making the combustion chamber of the rocket engine, which can reduce the costs for providing the diffusion barrier layer between the base member and the brazing foil, are provided.

BRIEF DESCRIPTION OF THE DRAWINGS

FIG. 12A is an assembly view of a combustion chamber of a rocket engine according to the first and second embodiments;

DESCRIPTION OF EMBODIMENTS

To help understand the effects of a brazing method and a method of making a combustion chamber of a rocket engine according to the present invention, firstly, a brazing method according to a comparative example of the present invention will be explained below.

Comparative Example

Figure 1:
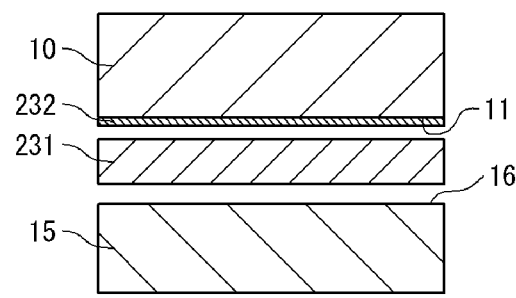
FIG. 1 is a cross-sectional view of a junction in a brazing method according to a comparative example of the present invention.

FIG. 1 shows a state of a junction (a part to be brazed) before brazing by the brazing method according to the comparative example of the present invention. As shown in FIG. 1, a brazing foil 231 is disposed between a base member 10 and a base member 15, which are to be brazed. Note that a surface 11 of the base member 10 and a surface 16 of the base member 15 are faced with each other. A shape of the base member 10 and a shape of the base member 15 are optional. The surface 11 and the surface 16 may be curved or in a plane. A metal layer 232 which serves as a plating layer is formed on the surface 11. The base member 10 is made of magnesium alloy, aluminum alloy, titanium alloy, iron alloy, cobalt alloy, nickel alloy, copper alloy, pure magnesium, pure aluminum, pure titanium, pure iron, pure cobalt, pure nickel, or pure copper. The brazing foil 231 is made of cobalt-based brazing material, nickel-based brazing material, copper-based brazing material, palladium-based brazing material, silver-based brazing material, or gold-based brazing material. The metal layer 232 is made of nickel, copper, gold, alloy composed mainly of nickel, alloy composed mainly of copper, or alloy composed mainly of gold. A material of the base member 15 is different from a material of the base member 10. Thickness of the brazing foil 231 is 10~200 μm, and thickness of the metal layer 232 is 5~20 μm.

The base member 10 and the base member 15 are brazed using the brazing foil 231 by heating in a state where the metal layer 232 on the surface 11 of the base member 10 contacts with the brazing foil 231 and the brazing foil 231 contacts with the surface 16 of the base member 15. During brazing, since components of the base member 10, components of the metal layer 232, and components of the brazing foil 231 are diffused, a boundary of the base member 10 and the metal layer 232 becomes unclear and a boundary of the metal layer 232 and the brazing foil 231 becomes unclear. During brazing, since the components of the brazing foil 231 and components of the base member 15 are diffused, a boundary of the brazing foil 231 and the base member 15 becomes unclear. Note that in case that temperature of reaction of the components of the brazing foil 231 and the components of the base member 10 is low or diffusion speed of the components of the brazing foil 231 in the base member 10 is fast, there is a possibility that defects or a weakened layer, which causes a decrease in the mechanical strength of the junction, is created unless the reaction of the base member 10 and the brazing foil 231 during brazing is suppressed to some extent. The metal layer 232 serves as a diffusion barrier layer, which suppresses to some extent the reaction of the base member 10 and the brazing foil 231 during brazing. That is, a material of the metal layer 232 is selected according to the material of the base member 10 and the material of the brazing foil 231.

Figure 2:
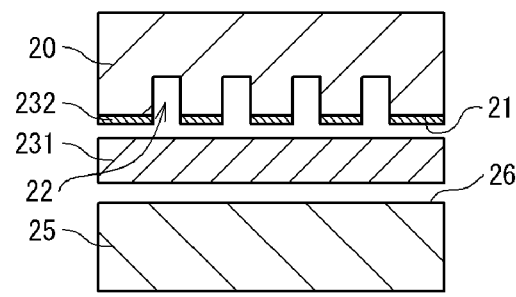
FIG. 2 is a cross-sectional view of another junction in a brazing method according to the comparative example of the present invention.

FIG. 2 shows a state of another junction (a part to be brazed) before brazing by the brazing method according to the comparative example. As shown in FIG. 2, a brazing foil 231 is disposed between a base member 20 and a base member 25, which are to be brazed. Note that a surface 21 of the base member 20 and a surface 26 of the base member 25 are faced with each other. A shape of the base member 20 and a shape of the base member 25 are optional. The surface 21 and the surface 26 may be curved or in a plane. A plurality of grooves 22 are formed in the surface 21. A metal layer 232, which serves as a plating layer, is formed on a portion of the surface 21 except a portion which corresponds to the plurality of grooves 22. The base member 20 is made of magnesium alloy, aluminum alloy, titanium alloy, iron alloy, cobalt alloy, nickel alloy, copper alloy, pure magnesium, pure aluminum, pure titanium, pure iron, pure cobalt, pure nickel, or pure copper. The brazing foil 231 is made of cobalt-based brazing material, nickel-based brazing material, copper-based brazing material, palladium-based brazing material, silver-based brazing material, or, gold-based brazing material. The metal layer 232 is made of nickel, copper, gold, alloy composed mainly of nickel, alloy composed mainly of copper, or alloy composed mainly of gold. A material of the base member 25 is different from a material of the base member 20.

The base member 20 and the base member 25 are brazed using the brazing foil 231 by heating in a state where the metal layer 232 on the surface 21 of the base member 20 contacts with the brazing foil 231 and the brazing foil 231 contacts with the surface 26 of the base member 25. During brazing, since components of the base member 20, components of the metal layer 232, and components of the brazing foil 231 are diffused, a boundary of the base member 20 and the metal layer 232 becomes unclear and a boundary of the metal layer 232 and the brazing foil 231 becomes unclear. During brazing, since the components of the brazing foil 231 and components of the base member 25 are diffused, a boundary of the brazing foil 231 and the base member 25 becomes unclear. Note that in case that temperature of reaction of the components of the brazing foil 231 and the components of the base member 20 is low or diffusion speed of the components of the brazing foil 231 in the base member 20 is fast, there is a possibility that defects or a weakened layer, which causes a decrease in the mechanical strength of the junction, is created unless the reaction of the base member 20 and the brazing foil 231 during brazing is suppressed to some extent. The metal layer 232 serves as a diffusion barrier layer which suppresses to some extent the reaction of the base member 20 and the brazing foil 231 during brazing. That is, a material of the metal layer 232 is selected according to the material of the base member 20 and the material of the brazing foil 231.

Problems of the brazing method according to the comparative example will be explained. In case that the surface 11 and 21 is a curved surface such as a cylindrical surface or area of the surface 11 and 21 is large, controlling thickness of the metal layer 232 in forming the metal layer 232 by plating is difficult. In case that size of the base member 10 and 20 is large, it requires a large-size plating bath and a large amount of a bath solution. Then, equipment costs and running costs for plating become high. In case that the metal layer 232 is formed on the base member 20 by electroplating without masking the grooves 22, there is a possibility that a mass of the plating material is formed in a corner portion of the grooves 22. In case that flow passages corresponding to the grooves 22 are formed by brazing the base member 25 to the base member 20, the mass of the plating material clogs at least partially the flow passages. In case that the grooves 22 should not be plated as described above, a step of filling the masking material in the grooves 22 before forming the metal layer 232 on the surface 21 of the base member 20 by plating and a step of removing the masking material after having formed the metal layer 232 are required.

Next, with reference to the drawings, a brazing method and a method of making a combustion chamber of a rocket engine according to embodiments of the present invention will be described below.

First Embodiment

Figure 3:
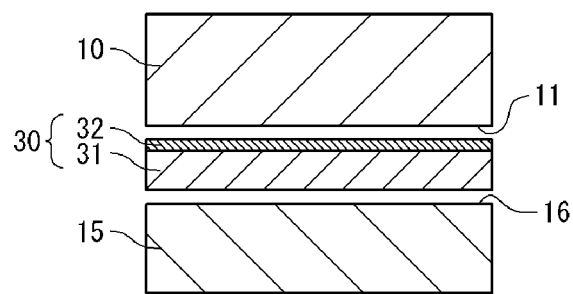
FIG. 3 is a cross-sectional view of a junction in a brazing method according to the first embodiment of the present invention.

FIG. 3 shows a state of a junction (a part to be brazed) before brazing based on a brazing method according to the first embodiment of the present invention. With reference to FIG. 3, the brazing method according to the first embodiment, which is applied to base members of a first sample, will be explained. As shown in FIG. 3, a laminated body 30 is disposed between a base member 10 and a base member 15, which are to be brazed. The laminate body 30 includes a brazing foil 31 and a metal layer 32 coupled to the brazing foil 31. Note that the base member 10, the metal layer 32, the brazing foil 31 and the base member 15 are arranged in this order, and a surface 11 of the base member 10 and a surface 16 of the base member 15 are faced with each other. The Surface 11 is a non-plated surface. The brazing foil 31 is made of cobalt-based brazing material, nickel-based brazing material, copper-based brazing material, palladium-based brazing material, silver-based brazing material, or, gold-based brazing material. The metal layer 32 is made of nickel, copper, gold, alloy composed mainly of nickel, alloy composed mainly of copper, or alloy composed mainly of gold. Thickness of the brazing foil 31 is 10~200 μm, and thickness of the metal layer 32 is 5~20 μm. For example, the thickness of the brazing foil 31 is 50 μm, and the thickness of the metal layer 32 is 10 μm.

The base member 10 and the base member 15 are brazed using the brazing foil 31 by heating in a state where the surface 11 of the base member 10 contacts with the metal layer 32 and the brazing foil 31 contacts with the surface 16 of the base member 15. Note that HIP brazing method may be applied or another brazing method may be applied. During brazing, since components of the base member 10, components of the metal layer 32, and components of the brazing foil 31 are diffused, a boundary of the base member 10 and the metal layer 32 becomes unclear and a boundary of the metal layer 32 and the brazing foil 31 becomes unclear. During brazing, since the components of the brazing foil 31 and components of the base member 15 are diffused, a boundary of the brazing foil 31 and the base member 15 becomes unclear. Note that in case that reaction temperature of the components of the brazing foil 31 and the components of the base member 10 is low or diffusion speed of the components of the brazing foil 31 in the base member 10 is fast, there is a possibility that defects or a weakened layer, which causes a decrease in the mechanical strength of the junction, is created unless the reaction of the base member 10 and the brazing foil 31 during brazing is suppressed to some extent. The metal layer 32 serves as a diffusion barrier layer which suppresses to some extent the reaction of the base member 10 and the brazing foil 31 during brazing. That is, a material of the metal layer 32 is selected according to the material of the base member 10 and the material of the brazing foil 31.

Figure 4:
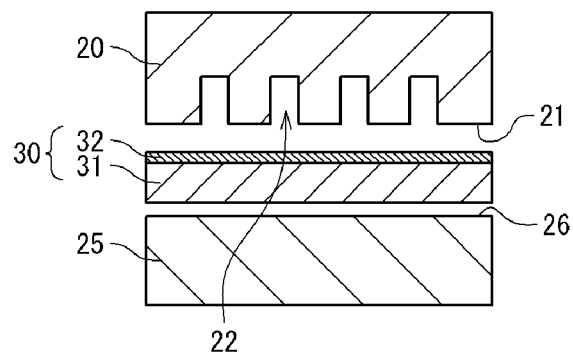
FIG. 4 is a cross-sectional view of another junction in the brazing method according to the first embodiment.

With reference to FIG. 4, the brazing method according to the first embodiment, which is applied to base members of a second sample, will be explained. As shown in FIG. 4, a laminated body 30 is disposed between a base member 20 and a base member 25, which are to be brazed. Note that the base member 20, the metal layer 32, the brazing foil 31 and the base member 25 are arranged in this order, and a surface 21 of the base member 20 and a surface 26 of the base member 25 are faced with each other. The Surface 21 is a non-plated surface. Note that in the surface of the base member 20, which faces to the base member 25, grooves 22 are formed by cuts or notches. The grooves 22 may be formed in a comb shape.

The base member 20 and the base member 25 are brazed using the brazing foil 31 by heating in a state where the surface 21 of the base member 20 contacts with the metal layer 32 and the brazing foil 31 contacts with the surface 26 of the base member 25. Note that HIP brazing method may be applied or another brazing method may be applied. During brazing, since components of the base member 20, components of the metal layer 32, and components of the brazing foil 31 are diffused, a boundary of the base member 20 and the metal layer 32 becomes unclear and a boundary of the metal layer 32 and the brazing foil 31 becomes unclear. During brazing, since the components of the brazing foil 31 and components of the base member 25 are diffused, a boundary of the brazing foil 31 and the base member 25 becomes unclear. Note that in case that temperature of reaction of the components of the brazing foil 31 and the components of the base member 20 is low or diffusion speed of the components of the brazing foil 31 in the base member 20 is fast, there is a possibility that defects or a weakened layer, which causes a decrease in the mechanical strength of the junction, is created unless the reaction of the base member 20 and the brazing foil 31 during brazing is suppressed to some extent. The metal layer 32 serves as a diffusion barrier layer which suppresses to some extent the reaction of the base member 20 and the brazing foil 31 during brazing. That is, a material of the metal layer 32 is selected according to the material of the base member 20 and the material of the brazing foil 31.

Figure 5:
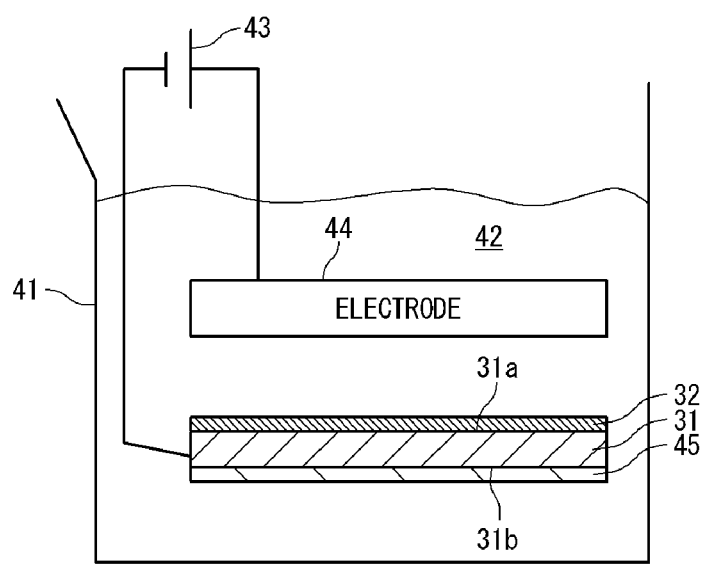
FIG. 5 is a schematic diagram illustrating a method of making a laminated body used in the brazing method according to the first embodiment.

With Reference to FIG. 5, a method of making the laminated body 30 will be described. The metal layer 32 is formed by electroplating. The brazing foil 31 includes a surface 31a and a surface 31b opposite the surface 31a. The surface 31b is covered with material 45 for preventing plating. DC power supply 43 is connected to the brazing foil 31 and the electrode 44 immersed in a bath solution 42 in a plating bath 41, and the metal layer 32 is formed on the surface 31a. As compared with a case that the base member 10 or 20 is being plated, the plating bath 41 may be miniaturized and an amount of the bath solution 42 may be reduced.

Figure 6:
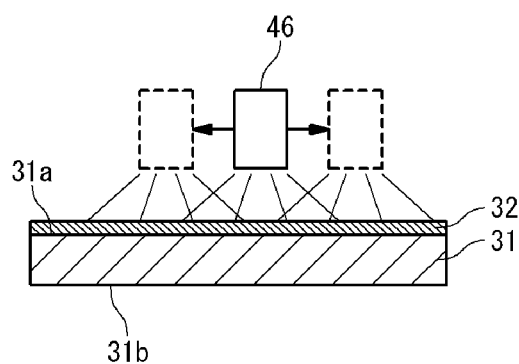
FIG. 6 is a schematic diagram illustrating another method of making the laminated body used in the brazing method according to the first embodiment.

With Reference to FIG. 6, another method of making the laminated body 30 will be described. The metal layer 32 is formed by sputtering. Particles from a sputtering device 46 are deposited on the surface 31a of the brazing foil 31, while the sputtering device 46 is being moved along the surface 31a of the brazing foil 31. Hereby, the metal layer 32 is formed.

Figure 7:
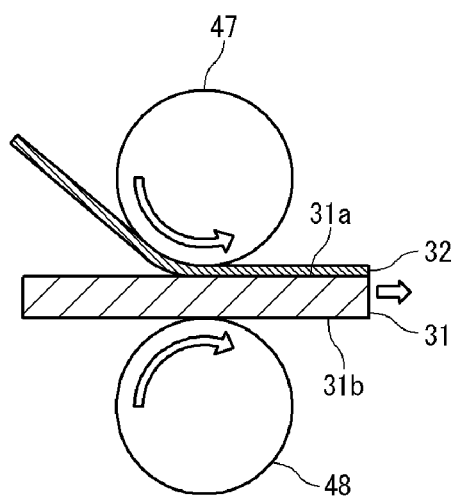
FIG. 7 is a schematic diagram illustrating still another method of making the laminated body used in the brazing method according to the first embodiment.

With Reference to FIG. 7, still another method of making the laminated body 30 will be described. A metal foil for forming the metal layer 32 and the brazing foil 31 are press-bonded by rollers 47 and 48. Hereby, the laminated body 30 is produced. The metal foil is press-bonded to the surface 31a of the brazing foil 31.

Note that the method of making the laminated body 30 is not limited to the above examples.

Since the metal layer, which serves as the diffusion barrier layer, is not formed on the base member 10 and 20 by plating, the brazing method of this embodiment is executable without depending on the shape and size of the base member 10 and 20. Since the metal layer, which serves as the diffusion barrier layer, is not formed on the base member 10 and 20 by plating, the brazing method of this embodiment does not require a large-sized plating bath for plating the base member 10 and 20. Therefore, costs for making the diffusion barrier layer (the equipment costs and running costs) can be reduced. In particular, costs reduction effect is large in a case of providing a diffusion barrier layer of gold. Since the metal layer, which serves as the diffusion barrier layer, is not formed on the base member 20 by plating, a step of filling the masking material in the grooves 22 formed in the surface 21 of the base member 20 and a step of removing the masking material are not required. Since the metal layer 32 is formed on the brazing foil 31, thickness control of the metal layer 32 is easy, and various methods such as electroplating, sputtering, press-bonding, etc. are applicable for forming the metal layer 32.

Figure 8:
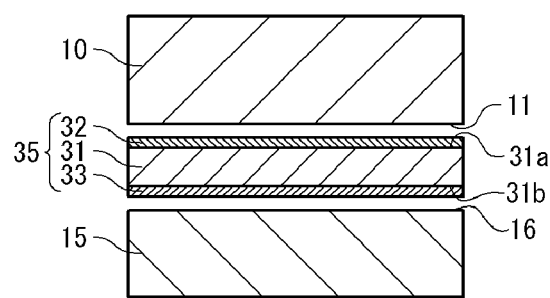
FIG. 8 is a cross-sectional view of a junction in a brazing method according to a first modification of the first embodiment.

FIG. 8 shows a state of a junction (a part to be brazed) before brazing according to a brazing method of a first modification of the first embodiment, which is applied to the base members of the first sample. With reference to FIG. 8, the brazing method according to the first modification of the first embodiment will be described. As shown in FIG. 8, a laminated body 35 is disposed between the base member 10 and the base member 15, which are to be brazed. The laminate body 35 includes the brazing foil 31, the metal layer 32 coupled to the surface 31a of the brazing foil 31, and a metal layer 33 coupled to the surface 31b of the brazing foil 31. Note that the base member 10, the metal layer 32, the brazing foil 31, the metal layer 33 and the base member 15 are arranged in this order, and the surface 11 of the base member 10 and the surface 16 of the base member 15 are faced with each other. The Surfaces 11 and 16 are non-plated surfaces. The base member 15 is made of magnesium alloy, aluminum alloy, titanium alloy, iron alloy, cobalt alloy, nickel alloy, copper alloy, pure magnesium, pure aluminum, pure titanium, pure iron, pure cobalt, pure nickel, or pure copper. The metal layer 33 is made of nickel, copper, gold, alloy composed mainly of nickel, alloy composed mainly of copper, or alloy composed mainly of gold. Thickness of the metal layer 33 is 5~20 μm. For example, the thickness of the metal layer 33 is 10 μm. Note that temperature of reaction of the components of the brazing foil 31 and the components of the base member 15 is low or diffusion speed of the components of the brazing foil 31 in the base member 15 is fast.

The base member 10 and the base member 15 are brazed using the brazing foil 31 by heating in a state where the surface 11 of the base member 10 contacts with the metal layer 32 and the metal layer 33 contacts with the surface 16 of the base member 15. Note that HIP brazing method may be applied or another brazing method may be applied. During brazing, since components of the base member 10, components of the metal layer 32, and components of the brazing foil 31 are diffused, a boundary of the base member 10 and the metal layer 32 becomes unclear and a boundary of the metal layer 32 and the brazing foil 31 becomes unclear. During brazing, since the components of the brazing foil 31, components of the metal layer 33, and components of the base member 15 are diffused, a boundary of the brazing foil 31 and the metal layer 33 becomes unclear and a boundary of the metal layer 33 and the base member 15 becomes unclear. As described above, the metal layer 32 serves as the diffusion barrier layer which suppresses to some extent the reaction of the base member 10 and the brazing foil 31 during brazing. The metal layer 33 serves as the diffusion barrier layer which suppresses to some extent the reaction of the base member 15 and the brazing foil 31 during brazing. That is, a material of the metal layer 33 is selected according to the material of the base member 15 and the material of the brazing foil 31. The material of the base member 15 may be different from or the same as the material of the base member 10. In case that the material of the base member 15 is the same as the material of the base member 10, the material of the metal layer 33 is preferably the same as the material of the metal layer 32. Note that the laminated body 35 may be made by forming the metal layer 32 on the surface 31a of the brazing foil 31 by electroplating and forming the metal layer 33 on the surface 31b of the brazing foil 31 by electroplating. Note that the laminated body 35 may be made by forming the metal layer 32 on the surface 31*a* of the brazing foil 31 by sputtering and forming the metal layer 33 on the surface 31*b* of the brazing foil 31 by sputtering. Note that the laminated body 35 may be made by press-bonding the metal foil for forming the metal layer 32 on the surface 31*a* of the brazing foil 31 and press-bonding the metal foil for forming the metal layer 33 on the surface 31*b* of the brazing foil 31.

Regarding to the base members of the second sample, in case that temperature of reaction of the components of the brazing foil 31 and the components of the base member 25 is low or diffusion speed of the components of the brazing foil 31 in the base member 25 is fast, the laminated body 35 instead of the laminated body 30 is used in plating the base member 20 and the base member 25. The base member 25 is made of magnesium alloy, aluminum alloy, titanium alloy, iron alloy, cobalt alloy, nickel alloy, copper alloy, pure magnesium, pure aluminum, pure titanium, pure iron, pure cobalt, pure nickel, or pure copper. As described above, the metal layer 32 serves as the diffusion barrier layer which suppresses to some extent the reaction of the base member 20 and the brazing foil 31 during brazing. The metal layer 33 serves as the diffusion barrier layer which suppresses to some extent the reaction of the base member 25 and the brazing foil 31 during brazing. That is, the material of the metal layer 33 is selected according to the material of the base member 25 and the material of the brazing foil 31. The material of the base member 25 may be different from or the same as the material of the base member 20. In case that the material of the base member 25 is the same as the material of the base member 20, the material of the metal layer 33 is preferably the same as the material of the metal layer 32.

Figure 9:
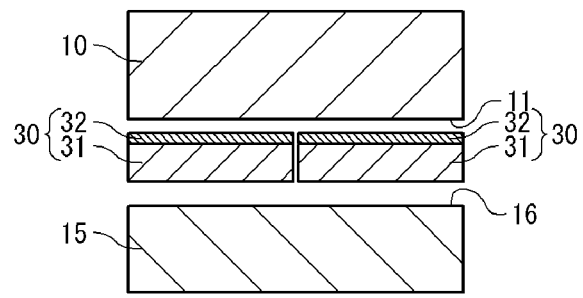
FIG. 9 is a cross-sectional view of a junction in a brazing method according to a second modification of the first embodiment.

FIG. 9 shows a state of a junction (a part to be brazed) before brazing according to a brazing method of a second modification of the first embodiment. As shown in FIG. 9, the brazing method according to the second modification of the first embodiment will be described. In this modification, as shown in FIG. 9, the plating is performed while a plurality of the laminated bodies 30 are disposed between the base member 10 and the base member 15, which are to be brazed. The plurality of laminated bodies 30 are arranged along the surface 11 and the surface 16. According to this modification, since the size of each laminated body can be miniaturized, the manufacture of laminated bodies 30 is facilitated. For example, in case of making laminated bodies 30 by electroplating, the plating bath 41 may be a small size and the amount of the bath solution 42 may be a small amount. Therefore, the equipment costs and running costs for making the laminated bodies can be reduced. Note that the plating may be performed while a plurality of the laminated bodies 35 are disposed between the base member 10 and the base member 15 in a state where the plurality of laminated bodies 35 are arranged along the surface 11 and the surface 16. Note that the plating may be performed while the plurality of laminated bodies 30 are disposed between the base member 20 and the base member 25 in a state where the plurality of laminated bodies 30 are arranged along the surface 21 and the surface 26. Note that the plating may be performed while the plurality of laminated bodies 35 are disposed between the base member 20 and the base member 25 in a state where the plurality of laminated bodies 35 are arranged along the surface 21 and the surface 26.

Second Embodiment

Figure 10:
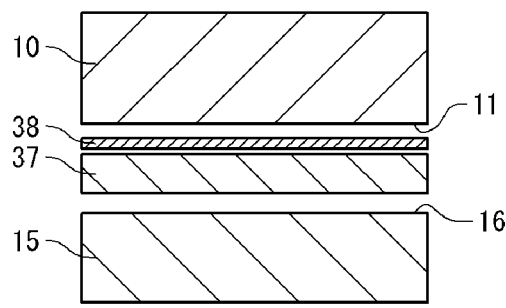
FIG. 10 is a cross-sectional view of a junction in a brazing method according to the second embodiment of the present invention.

FIG. 10 shows a state of a junction (a part to be brazed) before brazing by a brazing method according to the second embodiment of the present invention.

With reference to FIG. 10, the brazing method according to the second embodiment will be described. As shown in FIG. 10, a brazing foil 37 and a metal layer 38 are disposed between a base member 10 and a base member 15, which are to be brazed. The metal layer 38 is a metal foil, and the metal layer 38 is not coupled to the brazing foil 37. Note that the base member 10, the metal layer 38, the brazing foil 37, and the base member 15 are arranged in this order, and a surface 11 of the base member 10 and a surface 16 of the base member 15 are faced with each other. The Surface 11 is a non-plated surface. A material of the brazing foil 37 is the same as a material of the brazing foil 31. Thickness of the brazing foil 37 is 10~200 μm, and thickness of the metal layer 38 is 5~20 μm. For example, the thickness of the brazing foil 37 is 50 μm, and the thickness of the metal layer 38 is 10 μm.

The base member 10 and the base member 15 are brazed using the brazing foil 37 by heating in a state where the surface 11 of the base member 10 contacts with the metal layer 38, the metal layer 38 contacts with the brazing foil 37 and the brazing foil 37 contacts with the surface 16 of the base member 15. Note that HIP brazing method may be applied or another brazing method may be applied. During brazing, since components of the base member 10, components of the metal layer 38, and components of the brazing foil 37 are diffused, a boundary of the base member 10 and the metal layer 38 becomes unclear and a boundary of the metal layer 38 and the brazing foil 37 becomes unclear. During brazing, since the components of the brazing foil 37 and components of the base member 15 are diffused, a boundary of the brazing foil 37 and the base member 15 becomes unclear. Note that in case that temperature of reaction of the components of the brazing foil 37 and the components of the base member 10 is low or diffusion speed of the components of the brazing foil 37 in the base member 10 is fast, there is a possibility that defects or a weakened layer, which causes a decrease in the mechanical strength of the junction, is created unless the reaction of the base member 10 and the brazing foil 37 during brazing is suppressed to some extent. The metal layer 38 serves as a diffusion barrier layer which suppresses to some extent the reaction of the base member 10 and the brazing foil 37 during brazing. That is, a material of the metal layer 38 is selected according to the material of the base member 10 and the material of the brazing foil 37.

Note that the brazing method according to this embodiment may be applied to the brazing of the base members 20 and 25 of the second sample.

Since the metal layer, which serves as the diffusion barrier layer, is not formed on the base member 10 and 20 by plating, the brazing method of this embodiment is executable without depending on the shape and size of the base member 10 and 20. Since the metal layer, which serves as the diffusion barrier layer, is not formed on the base member 10 and 20 by plating, the brazing method of this embodiment does not require a large-sized plating bath and a large amount of a bath solution for plating the base member 10 and 20. Therefore, costs for making the diffusion barrier layer (the equipment costs and running costs) can be reduced. Since the metal layer, which serves as the diffusion barrier layer, is not formed on the base member 20 by plating, a step of filling the masking material in the grooves 22 formed in the surface 21 of the base member 20 and a step of removing the masking material are not required. Since the metal layer 38 is the metal foil, thickness control of the metal layer 38 is easy. According to this embodiment, plating process, sputtering process and press-bonding process for the brazing foil 37 are not required. Since the plating process is not required, masking when plating is not also required.

Figure 11:
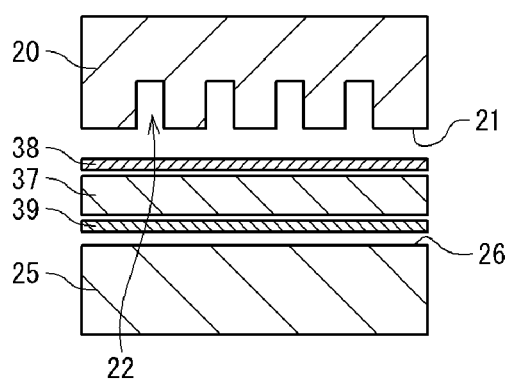
FIG. 11 is a cross-sectional view of a junction in a brazing method according to a first modification of the second embodiment.

FIG. 11 shows a state of a junction (a part to be brazed) before brazing according to a brazing method of a first modification of the second embodiment. With reference to FIG. 11, the brazing method according to the first modification of the second embodiment will be described. As shown in FIG. 11, the metal layer 38, the brazing foil 37 and a metal layer 39 are disposed between the base member 20 and the base member 25, which are to be brazed. The metal layer 39 is a metal foil, and the metal layer 39 is not coupled to the brazing foil 37. Note that the base member 20, the metal layer 38, the brazing foil 37, the metal layer 39 and the base member 25 are arranged in this order, and the surface 21 of the base member 20 and the surface 26 of the base member 25 are faced with each other. The surfaces 21 and 26 are non-plated surfaces. The base member 25 is made of magnesium alloy, aluminum alloy, titanium alloy, iron alloy, cobalt alloy, nickel alloy, copper alloy, pure magnesium, pure aluminum, pure titanium, pure iron, pure cobalt, pure nickel, or pure copper. The metal layer 39 is made of nickel, copper, gold, alloy composed mainly of nickel, alloy composed mainly of copper, or alloy composed mainly of gold. Thickness of the metal layer 39 is 5~20 μm. For example, the thickness of the metal layer 39 is 10 μm. Note that temperature of reaction of the components of the brazing foil 37 and the components of the base member 25 is low or diffusion speed of the components of the brazing foil 37 in the base member 25 is fast.

The base member 20 and the base member 25 are brazed using the brazing foil 37 by heating in a state where the surface 21 of the base member 20 contacts with the metal layer 38, the metal layer 38 contacts with the brazing foil 37, the brazing foil 37 contacts with the metal layer 39 and the metal layer 39 contacts with the surface 26 of the base member 25. Note that HIP brazing method may be applied or another brazing method may be applied. During brazing, since components of the base member 20, the components of the metal layer 38, and the components of the brazing foil 37 are diffused, a boundary of the base member 20 and the metal layer 38 becomes unclear and a boundary of the metal layer 38 and the brazing foil 37 becomes unclear. During brazing, since the components of the brazing foil 37, components of the metal layer 39, and components of the base member 25 are diffused, a boundary of the brazing foil 37 and the metal layer 39 becomes unclear and a boundary of the metal layer 39 and the base member 25 becomes unclear. The metal layer 38 serves as the diffusion barrier layer which suppresses to some extent the reaction of the base member 20 and the brazing foil 37 during brazing. The metal layer 39 serves as the diffusion barrier layer which suppresses to some extent the reaction of the base member 25 and the brazing foil 37 during brazing. That is, a material of the metal layer 39 is selected according to the material of the base member 25 and the material of the brazing foil 37. The material of the base member 25 may be different from or the same as the material of the base member 20. In case that the material of the base member 25 is the same as the material of the base member 20, the material of the metal layer 39 is preferably the same as the material of the metal layer 38.

Note that the brazing method according to this embodiment may be applied to the brazing of the base members 10 and 15.

According to this modification of this embodiment, even if the material (component) of the metal layer 38 is different from the material (component) of the metal layer 39, it is possible to dispose metal foils of different materials (components) on different sides of the brazing foil 37, respectively. Therefore, the brazing method according to this modification is easier than the brazing method using the laminated body 35 including the metal layer 32 and the metal layer 33 in case that the material (component) of the metal layer 32 and the material (component) of the metal layer 33 are different with each other. The brazing method according to this modification is easier than the brazing method using laminated body 35 including the metal layer 32 and the metal layer 33 produced by electroplating or sputtering in case that the material (component) of the metal layer 32 and the material (component) of the metal layer 33 are different with each other.

Figure 12B:
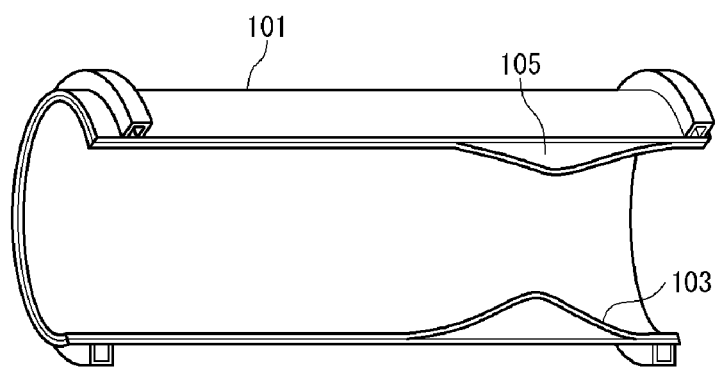
FIG. 12B is a cross-sectional view of the combustion chamber of the rocket engine according to the first and second embodiments.

The brazing method according to any one of above described embodiments can be applied to the manufacture of a combustion chamber of a rocket engine. For example, as shown in FIG. 12A, by using the brazing method according to any one of above described embodiments, it is possible to braze two throat supports 105 with each other, braze throat supports 105 and a coolant liner 103, or braze a structural jacket 101 and the coolant liner 103. FIG. 12B is a cross-sectional view of the combustion chamber of the rocket engine. In case that the base member 20 is the coolant liner 103, the grooves 22 become fluid passages for flowing coolant fluid by brazing the base member 25 to the base member 20. The size of a component of the rocket engine combustion chamber is a large. Therefore, if the brazing method according to any one of above described embodiments is applied, costs are greatly reduced compared to the case that the metal layer, which serves as the diffusion barrier layer, is formed on the component by plating.

(The Comparison Result Between the Junction According to the Comparative Example and the Junction According to the First Embodiment)

Next, the result of quality comparison between the junction according to the comparative example and the junction according to the first embodiment will be described. The junction according to the comparative example is formed by the brazing method shown in FIG. 1. Note that a gold plating layer 232, which serves as a diffusion barrier layer, is formed on the surface 11 and a nickel plating layer is formed on the surface 16 for improving wettability of the base member 15. The junction according to the first embodiment is formed by the brazing method shown in FIG. 3. Note that the brazing foil 31, on which a gold plating layer 32 is formed, is used and a nickel plating layer is formed on the surface 16 for improving wettability of the base member 15. Cross-sectional photographs of the junction according to the comparative example and the junction according to the first embodiment were taken. Tensile tests of the junction according to the comparative example and the junction according to the first embodiment were performed.

Figure 13A:
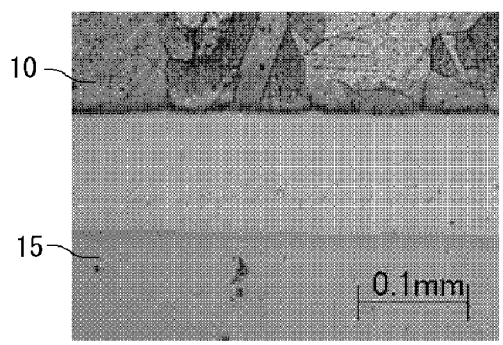
FIG. 13A is a cross-sectional photograph of the junction according to the comparative example.
Figure 13B:
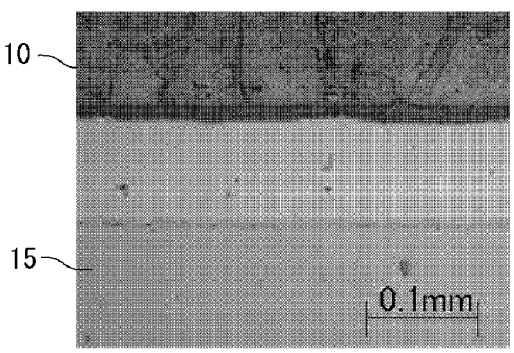
FIG. 13B is a cross-sectional photograph of the junction according to the first embodiment.

With reference to the cross-sectional photograph of the junction according to the comparative example as shown in FIG. 13A and the cross-sectional photograph of the junction according to the first embodiment as shown in FIG. 13B, defects could not be found in both the junction according to the comparative example and the junction according to the first embodiment.

Figure 14:
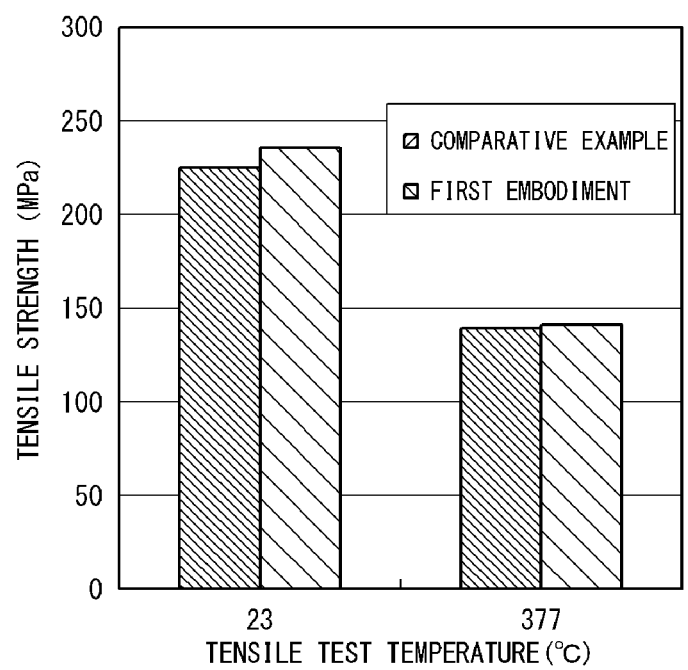
FIG. 14 shows the results of tensile test of the junction according to the comparative example and tensile test of the junction according to the first embodiment.

With reference to FIG. 14, results of the tensile tests of the junction according to the comparative example and the junction according to the first embodiment will be explained. The tensile strength of the junction according to the comparative example was equivalent to the tensile strength of the junction according to the first embodiment under experimental temperature both 23 degrees Celsius and 377 degrees Celsius.

Therefore, difference in the quality between the junction according to the comparative example and the junction according to the first embodiment was not observed.

Though the brazing method and the method of making the combustion chamber of the rocket engine according to the present invention have been described above with reference to the embodiments, the brazing method and the method of making the combustion chamber of the rocket engine according to the present invention are not limited to the above embodiments.

Various modifications may be made to the above embodiments. A matter disclosed in an embodiment mentioned above, and a matter disclosed in another embodiment mentioned above, can be combined. The brazing method according to the present invention may be applied for making a product other than the combustion chamber of the rocket engine.

It should be noted that this application claims a priority based on Japan Patent Application No. JP 2012-041047 filed on Feb. 28, 2012, and the disclosure thereof is incorporated herein by reference.

The invention claimed is:

1. A brazing method comprising:
    arranging a first base member having a non-plated first surface, a metal layer serving as a diffusion barrier layer, a brazing foil, and a second base member having a second surface in order of the first base member, the metal layer, the brazing foil, and the second base member, wherein the non-plated first surface of the first base member and the second surface of the second base member face each other; and
    brazing the first base member and the second base member using the brazing foil,
    wherein the arranging comprises contacting the first base member with the metal layer, contacting the metal layer with the brazing foil, and contacting the brazing foil with the second base member,
    wherein the brazing comprises heating in a state where the first base member contacts with the metal layer, the metal layer contacts with the brazing foil, and the brazing foil contacts with the second base member,
    wherein the metal layer is not bonded to the first base member before the brazing of the first base member and the second base member,
    wherein the brazing foil is made of cobalt-based brazing material, nickel-based brazing material, copper-based brazing material, palladium-based brazing material, silver-based brazing material, or gold-based brazing material,
    and wherein a thickness of the metal layer is 5 µm to 20 µm.

2. The brazing method according to claim 1, further comprising:
    making a laminated body comprising the brazing foil and the metal layer coupled to the brazing foil before the first base member contacts with the metal layer,
    wherein the arranging of the first base member, the metal layer, the brazing foil, and the second base member comprises arranging the laminated body between the first base member and the second base member.

3. The brazing method according to claim 2, wherein the laminated body comprises a plurality of laminated bodies, and wherein the arranging of the first base member, the metal layer, the brazing foil, and the second base member comprises arranging the plurality of laminated bodies between the first base member and the second base member so that the plurality of laminated bodies are disposed along the non-plated first surface and the second surface.

4. The brazing method according to claim 2, further comprising:
    making the laminated body by forming the metal layer on a surface of the brazing foil by electroplating.

5. The brazing method according to claim 2, further comprising:
    making the laminated body by forming the metal layer on a surface of the brazing foil by sputtering.

6. The brazing method according to claim 2, further comprising:
    making the laminated body by press-bonding a metal foil for forming the metal layer to the brazing foil.

7. The brazing method according to claim 1, wherein the metal layer is a first metal foil.

8. A method of making a combustion chamber of a rocket engine comprising:
    arranging a first base member having a non-plated first surface, a metal layer serving as a diffusion barrier layer, a brazing foil, and a second base member having a second surface in order of the first base member, the metal layer, the brazing foil, and the second base member, wherein the non-plated first surface of the first base member and the second surface of the second base member face each other; and
    brazing the first base member and the second base member using the brazing foil,
    wherein a coolant channel serving as a flow passage of coolant fluid is formed in the non-plated first surface,
    wherein the brazing foil is made of cobalt-based brazing material, nickel-based brazing material, copper-based brazing material, palladium-based brazing material, silver-based brazing material, or gold-based brazing material,
    wherein the metal layer is not bonded to the first base member before the brazing of the first base member and the second base member,
    and wherein a thickness of the metal layer is 5 µm to 20 µm.

9. A brazing method comprising:
    arranging a first base member having a non-plated first surface, a first metal foil serving as a diffusion barrier layer, a brazing foil, a second metal foil serving as a diffusion barrier layer and a second base member having a non-plated second surface in order of the first base member, the first metal foil, the brazing foil, the second metal foil, and the second base member, wherein the non-plated first surface of the first base member and the non-plated second surface of the second base member face each other; and
    brazing the first base member and the second base member using the brazing foil,
    wherein the arranging comprises contacting the first base member with the first metal foil, contacting the first metal foil with the brazing foil, contacting the brazing foil with the second metal foil, and contacting the second metal foil with the second base member,
    wherein the brazing comprises heating in a state where the first base member contacts with the first metal foil, the first metal foil contacts with the brazing foil, the brazing foil contacts with the second metal foil, and the second metal foil contacts with the second base member,
    wherein a material of the first metal foil is different from a material of the second metal foil, wherein the first metal foil has a different composition from the second metal foil, and wherein the brazing foil is made of cobalt-based brazing material, nickel-based brazing material, copper-based brazing material, palladium-based brazing material, silver-based brazing material, or gold-based brazing material, wherein the first metal foil and the second metal foil are not bonded to the first base and the second base member, respectively, before the brazing of the first base member and the second base member, and wherein a thickness of the first metal foil is 5 μm to 20 μm and a thickness of the second metal foil is 5 μm to 20 μm.

10. The method of making the combustion chamber of the rocket engine according to claim 8, wherein the flow passage is formed between the first base member and the metal layer.

\* \* \* \* \*